United States Patent [19]

Schellenberg

[11] Patent Number: 5,105,298
[45] Date of Patent: Apr. 14, 1992

[54] BIREFRINGENT STRUCTURES FORMED BY PHOTO-EXPOSURE OF POLYMER FILMS AND METHOD FOR FABRICATION THEREOF

[75] Inventor: Franklin M. Schellenberg, Cupertino, Calif.

[73] Assignee: Board of Trustees, Leland Stanford Jr. University, Stanford, Calif.

[21] Appl. No.: 379,527

[22] Filed: Jul. 12, 1989

[51] Int. Cl.[5] ............................ G02B 1/04; G02B 1/08; G02F 1/35
[52] U.S. Cl. ........................ 359/3; 252/585; 359/326; 359/500; 359/900
[58] Field of Search .................... 350/3.61, 3.64, 400, 350/406, 320; 307/425; 252/585

[56] References Cited

U.S. PATENT DOCUMENTS

| | | | |
|---|---|---|---|
| 3,622,220 | 11/1971 | Kogelnik | 350/394 |
| 4,707,303 | 11/1987 | Buckley et al. | 350/311 |
| 4,766,171 | 8/1988 | DeMartino | 350/311 |
| 4,768,846 | 9/1988 | Connors et al. | 350/3.64 |
| 4,793,670 | 12/1988 | Crossland et al. | 350/3.64 |
| 4,794,045 | 12/1988 | Robin et al. | 350/96.12 |
| 4,801,659 | 1/1989 | Leslie | 350/311 |
| 4,807,950 | 2/1989 | Glenn et al. | 350/3.61 |
| 4,824,522 | 4/1989 | Baker et al. | 350/96.12 |
| 4,859,876 | 8/1989 | Dirk et al. | 372/29 |
| 4,879,479 | 11/1989 | Frazier et al. | 350/96.12 |
| 4,946,231 | 8/1990 | Pistor | 350/370 |

OTHER PUBLICATIONS

Collier et al., *Optical Holography*, Chapter 12, "Nonlinear Recording Speckle, and Film Grain Noise," Academic Press, New York (1971), pp. 337 to 345.
Butcher et al., *The Elements of Nonlinear Optics*, Cambridge University Press, Cambridge (1990), pp. 1 to 11.
A. R. Tanguay et al., "Polarization Properties of the Variable-Grating-Mode Liquid-Crystal Device", *Optics Letters*, vol. 9, No. 5, pp. 174–176 (May 1984).
A. R. Tanguay, Jr. et al., "Optical Beam Propagation Method for Birefringent Phase Grating Diffraction," *Optical Engineering*, vol. 25, No. 2, pp. 235–249 (Feb. 1986).
A. R. Tanguay, "Polarization Properties of Birefringent Phase Gratings," 1982 Annual Meeting–Optical Society of America, Paper FU1, Friday, Oct. 22, 1982.
A. R. Tanguay, "Optical Diffraction Characteristics of the Variable Grating Mode Liquid Crystal Device", 1985 *Annual Meeting–Optical Society of America*, FS3, p. 98, Oct. 18, 1985.

(List continued on next page.)

Primary Examiner—Bruce Y. Arnold
Assistant Examiner—Martin Lerner
Attorney, Agent, or Firm—Townsend and Townsend

[57] ABSTRACT

A birefringent structure useful as a waveplate, grating, a hologram, a beam separator, a digital data storage medium or the like is formed by photo-exposure causing photo-reaction between photons and polymeric structures. In a specific embodiment, birefringence is induced by applying optical energy to a polymer film such as a polysilane with sufficient intensity to excite nonlinear absorption in the polymer film such that a pattern of the exposing optical energy is recorded in the polymer film. The optical energy is of a distinct polarization state such that the nonlinear optical effect evidences the polarization state. In another embodiment, an interference pattern of optical energy is applied to the polymer film such that it retains a record of the pattern of polarization state of exposing illumination. In accordance with a method of the invention, a preferred polymer is exposed to an interference pattern so as to excite the polymer by non-linear absorption to cause preferential degradation of the polymer chains which are aligned with the polarization of the exposing light. Suitable polymer material employed in the preferred embodiments is found in the family of polysilane polymers. The process by which the material is transformed to retain information about the polarization state of the exposing illumination is believed to be a molecular-level or atomic level two-photon absorption mechanism.

3 Claims, 5 Drawing Sheets

OTHER PUBLICATIONS

A. R. Tanguay, "Polarization Properties of Volume Phase Gratings on Optically Active Materials", 1984 *Annual Meeting-Optical Society of America*, FG3 p. 1313.

J. P. Herriau et al., "Some Polarization Properties of Volume Holograms in $Bi_{12}SiO_{20}$ Crystals and Applications", *Applied Optics*, vol. 17, No. 12, pp. 1851–1852.

M. P. Petrov et al., "Image Polarisation Characteristics Storage in Bi-Refringent Crystals", *Optics Communications*, vol. 21, No. 2 (May 1977) pp. 297–300.

C. D. Eisenbach, "Isomerization of Aromatic Azo Chromophores in Poly(ethylacrylate) Networks and Photomechanical Effect," *Polymer*, vol. 21, pp. 1175–1179.

L. Matejka et al., "Photomechanical Effects in Crosslinked Photochromic Polymers", *Polymer*, vol. 22 (Nov. 1981), pp. 1511–1515.

F. M. Schellenberg et al., "Two-Photon Absorption Induced Effects in Crystalline Polysilane Films," *XVI International Conference on Quantum Electronics Technical Digest* (Japan Society of Applied Physics, Tokyo, Japan), Jul. 18–21, 1988, pp. 702–703.

F. M. Schellenberg et al., "Nonlinear Polysilane Thin Films," Jul. 26, 1988, Symposium on Nonlinear Optics of Organics and Semiconductors, Univ. of Tokyo, Proceedings to be Published by Springer Verlag-Summer 1989.

F. M. Schellenberg et al., "Polarization Sensitive Optical Elements Using Polysilane Films," *AMOSA Technical Digest*, WK2, Nov. 2, 1988, p. 109 (Abstract).

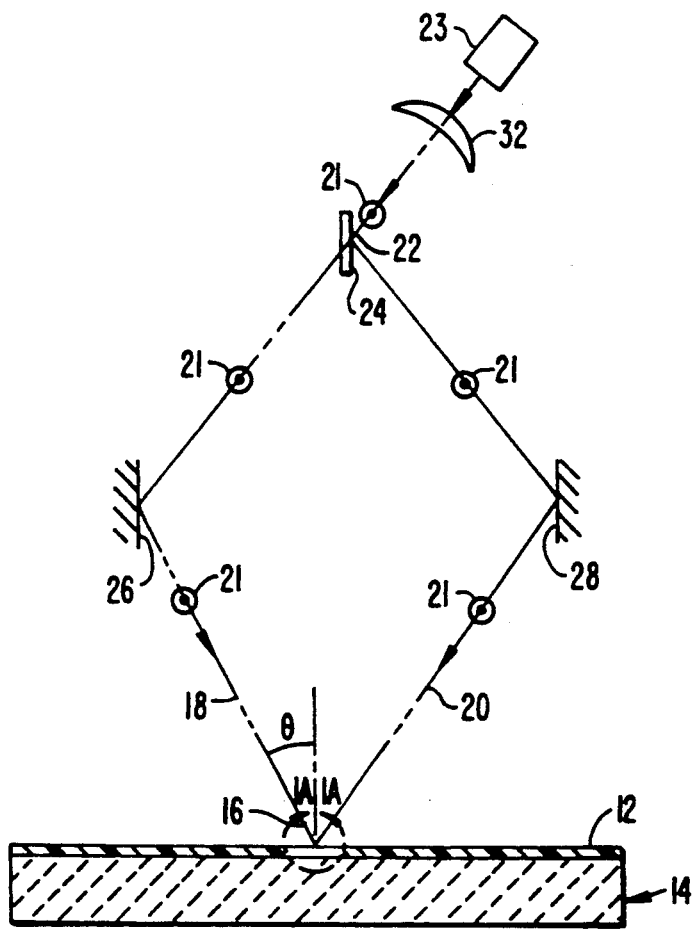
FIG._1.
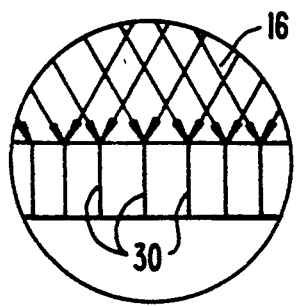
FIG._1A.

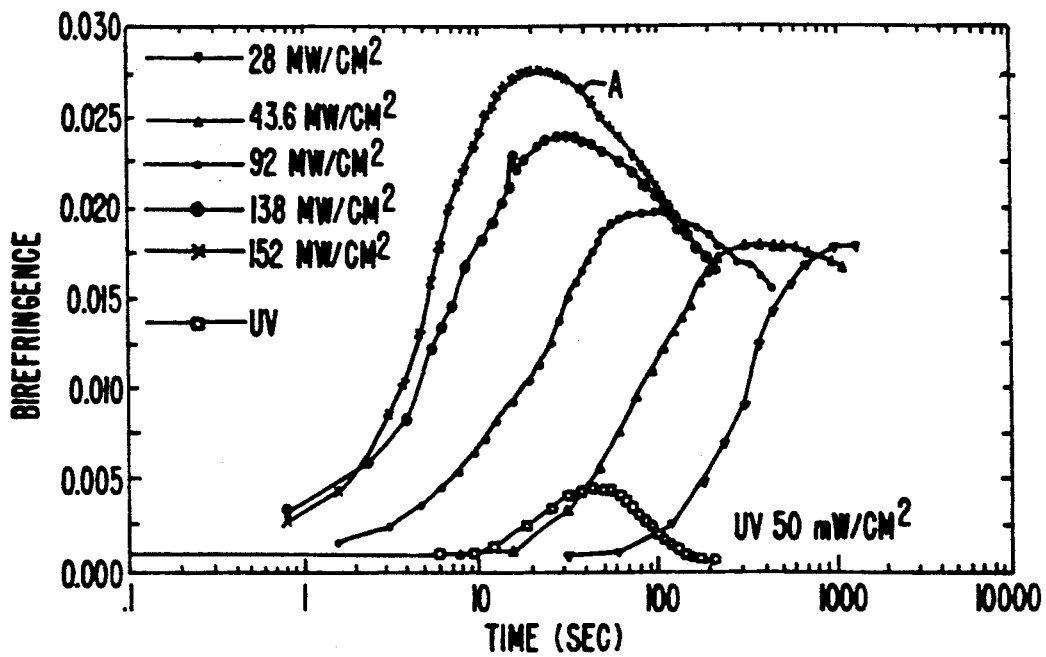
FIG._2.
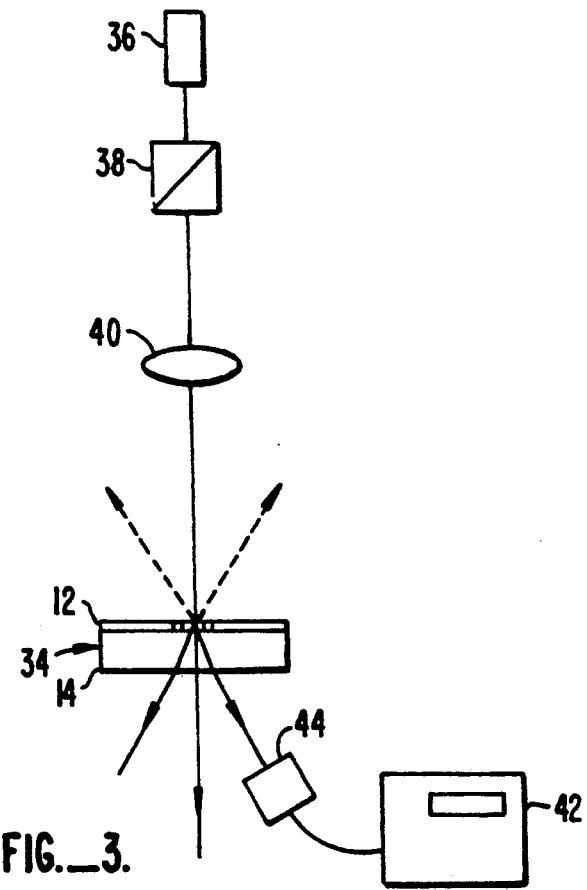
FIG._3.

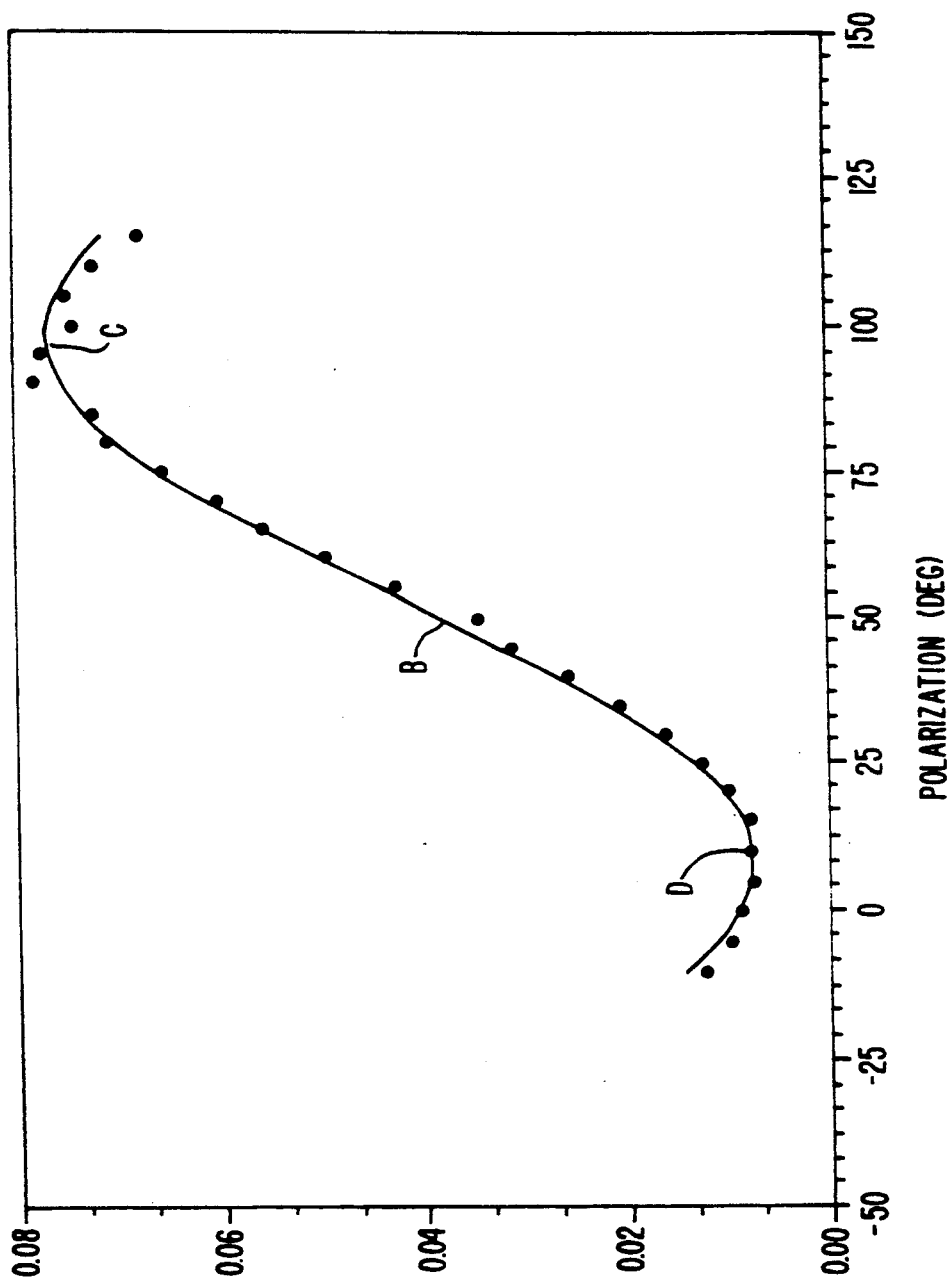
FIG._4.

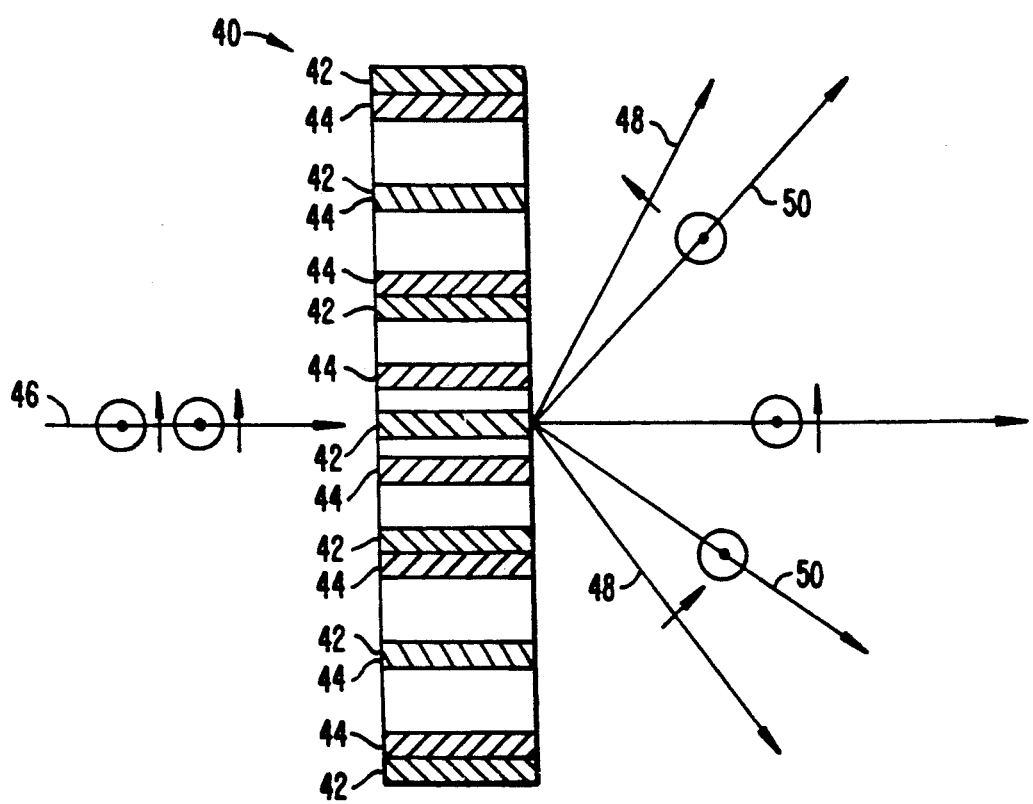
FIG._5.

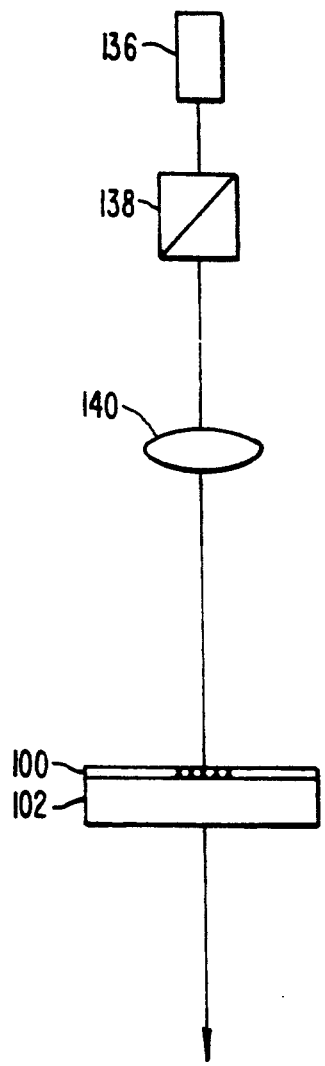
FIG._6.

BIREFRINGENT STRUCTURES FORMED BY PHOTO-EXPOSURE OF POLYMER FILMS AND METHOD FOR FABRICATION THEREOF

This invention was made under contract with or supported by the United States Air Force office of Scientific Research under Contract No. AFOSR-88-0354. The Government has certain rights in this invention.

BACKGROUND OF THE INVENTION

This invention relates to optical elements and more particularly to birefringent structures such as waveplates, diffraction gratings and holograms and to specific methods of fabrication. Anistotropic diffraction is a potentially valuable tool for manipulating optical information. Waveplates and diffraction gratings are among the fundamental tools for optics and spectroscopy.

Optical waveplates are used to control polarization of optical energy. They are conventionally manufactured from birefringent material. Two types of birefringent materials have been used: naturally-occurring crystals and for low-demand applications, stretched polymer films. In a stretched polymer film, the entire film is effected by the manufacturing process so that intricate patterns are impractically difficult to register therein.

With the advent of the laser, a diffraction pattern can be registered in a photo-sensitive medium through illumination by the interference pattern of two coherent plane waves of coherent radiation to cause a transformation in the medium. If the illumination consists of the superpositions of many plane waves, complex interference patterns can be registered in the medium, and the original wave fronts can be reconstructed by subsequent illumination of suitable coherence and pattern. This interference is a fundamental basis of the art of holography.

A grating can be optically-registered in a medium as a variation in transmission amplitude, as a variation in phase or both. Variations in transmission amplitude may be effected by altering absorption in the medium, and variations in phase may be effected by altering the refractive index. Phase-type gratings give the largest diffraction efficiencies.

Various photo-sensitive media have been used for fabrication of holograms and gratings. Such media includes silver halide emulsions, photo-refractive materials, dichromated gelatin, photoresist and formable polymers. These media are capable of forming a permanent record of light intensity by appropriate exposure to illumination and chemical development. When applied in a holographic configuration, the medium registers, in an interference pattern, information about the relative phases of the incident wave fronts. However, the medium is generally incapable of retaining information about the polarization state of the exposing illumination.

Polarization-sensitive gratings and light gates have been fabricated using liquid crystal materials. However, the fabrication of the device employing such materials is an intricate process, and the materials which are used are in a liquid state.

Some photorefractive media are known which are able to record holograms which are sensitive to polarization. Such media include photorefractive crystals. Photorefractive crystals are typically very expensive (on the order of hundreds of dollars each) and require relatively long exposure times (on the orders of milliseconds to seconds) in order to register the phasesensitive patterns.

What is needed is a technique and material suited to register the polarization state of exposing illumination which is relatively inexpensive, which is capable of registration of such information in very short times (on the order of nanoseconds), and which is suitable for birefringent waveplate, grating and holographic applications, as well as for any of a variety of applications of the birefringence.

SUMMARY OF THE INVENTION

According to the invention, a birefringent structure useful as a waveplate, grating, a hologram, a beam separator, a digital data storage medium or the like is formed by optically-radiative exposure causing photo-reaction between photons and polymeric structures (photo-exposure). In a specific embodiment, birefringence is induced by applying optical energy to a polymer film of a particular class of media with sufficient intensity to excite nonlinear absorption in the polymer film such that a pattern of the exposing optical energy is recorded as a nonlinear optical effect in the polymer film. The optical energy is of a distinct polarization state such that the nonlinear optical effect evidences the polarization state. In another embodiment, an interference pattern of optical energy is applied to the polymer film such that it retains a record of the pattern of polarization state of exposing illumination. The class of media comprises a thin polymer film which is isotropic in the two dimensions of the film plane, has a large non-linear absorption coefficient for optical energy and in which the polymer chains are oriented in the plane of the polymer layer. In accordance with a method of the invention, a polymer having the above characteristics is exposed to an interference pattern so as to excite the polymer by non-linear absorption to cause preferential degradation of the polymer chains which are aligned with the polarization of the exposing light. This form of excitation anisotropically reduces linear absorption in the blue/ultraviolet spectrum and anisotropically reduces the index of refraction in the visible spectrum so as to induce birefringence in the film upon photo-exposure. The degree of birefringence varies with the amount of photo-exposure. A specific suitable polymer material employed in the preferred embodiments is found in the family of polysilane polymers and specifically poly-(di-n-hexylsilane) or poly-(di-n-pentylsilane). The polymer material itself should exhibit minimal light scattering and generally possess strong linear absorption in the blue or ultraviolet spectral region, and minimal absorption in the visible region. The process by which the preferred material is transformed to retain information about the polarization state of the exposing illumination has been determined to be a molecular-level or atomic level two-photon absorption mechanism in polysilanes with side-chains of similar physical size.

Birefringent gratings may for example be fabricated by applying a film of the non-linear material to an appropriate substrate and exposing the substrate-mounted medium to an interference pattern of intense polarized light at wavelengths which excite the non-linear absorption characteristics of the medium. The index pattern created by photo-degradation preferentially occurs in polymer chains where the chains are oriented so that the backbone of the chains are parallel to the exposing coherent light polarization. As a result, the diffraction grating of induced birefringence defract preferentially that light which is polarized in the same direction as the initial exposing illumination, and orthogonally-polarized light experiences a uniform index of refraction such that no diffraction occurs.

The invention will be better understood by reference to the following detailed description in connection with the accompanying drawings.

BRIEF DESCRIPTION OF DRAWINGS

FIG. 1A is a diagram illustrating a method in accordance with the invention for forming a birefringent hologram or the like in accordance with the invention.

FIG. 1B is an expanded cross-sectional view of a section of FIG. 1A.

FIG. 2 is a chart illustrating the effect of exposure by pulsed laser light on birefringence as a function of time and intensity for laser light in the non-linear absorption region.

FIG. 3 is a diagram illustrating a specific exposure configuration.

FIG. 4 is a chart illustrating diffraction efficiency as a function of polarization.

FIG. 5 is a side cross-sectional view illustrating overlapping diffraction patterns of orthogonal polarization.

FIG. 6 is a diagram illustrating a method for writing a film with a polarized optical beam or sheet according to the invention.

DESCRIPTION OF SPECIFIC EMBODIMENTS

In reference to FIG. 6, a structure having an arbitrary birefringent pattern is prepared by applying a medium according to the invention as a film 100 to a substrate 102, and thereafter exposing the film 100 to polarized optical electromagnetic radiation in the spectral region from for example far infrared through visible to far ultraviolet. The exposure must be sufficient in intensity to cause degradation of the medium preferentially with the alignment of the polarized radiation. A source 136 produces a beam or a sheet output of radiation which is polarized by a polarizer 138, and the polarized radiation is directed by a guidance systems such as a lens 140 to a target. The resultant exposure creates an arbitrary birefringent pattern in the film 100.

In order to create a fixed waveplate, the radiation should produce a uniform retardation over the exposed region. This requires that attention be given to the relationship between the thickness of the film 100 and the degree of induced birefringence. FIG. 2 shows the degree of birefringence at 632 nm in a 700 nm thick film of poly-(di-n-hexylsilane). It shows that birefringence is related to exposure at various intensities produced by a pulsed laser at 570 nm with a pulse width of 8 nanoseconds at a repetition rate of 10 Hz. For contrast, the results of exposure of the medium to polarized continuous wave UV light is also shown. This is a largely linear process, whereas the other exposures are nonlinear absorption process. While some birefringence is observed with linear exposure by UV, birefringence is dramatically enhanced under exposure to high-intensity visible light resulting in nonlinear absorption. Linear birefringence is observed and noted, but it is not believed to be useful in comparison to the nonlinear birefringence.

This invention has potential applications in information storage as an application of a structure similar to a waveplate as shown in FIG. 6. Regions of birefringence, such as spots, are established against a neighboring background. These regions can establish a binary value in contrast to the background which can be read easily from a film by the polarization state of the light. In addition, the degree of birefringence in the spots can be used as a further basis for encoding multiple bits of information. Various encoding schemes may be adapted to this application. The shape of the storage medium can be adapted to conventional form factors.

In reference to FIGS. 1A and 1B, a grating in accordance with the invention may be fabricated by preparing a polymer film 12 of a specific composition on a substrate 14 and exposing it to interference pattern 16 formed by a first coherent (laser) beam 18 and a second coherent (laser) beam 20 derived from a common coherent optical (laser) beam 22 which has been split by a beam splitter 24 and has a linear electrical polarization 21 which is for example normal to the plane of the incident and reflected beams at each reflective surface, such that the first laser beam 18 reflects off a first mirror 26 and a second laser beam 20 reflects off a second opposing mirror 28 thereby to cause the first laser beam 18 and the second laser beam 20 to converge at the surface of the film 12. The interference pattern is of intense polarized light at a wavelength which excites the non-linear absorption characteristic of the film 12. The index pattern 30 formed by the interfering laser beams 18 and 20 in the film 12 preferentially occurs in polymer chains where the chains are oriented so that the backbone of the chains are parallel to the exposing coherent light polarization.

The invention relies on use of a material with the desired properties. A suitable material is a type of polysilane polymer. The polymer material has the following properties: It is easily applied to a mechanical supporting substrate. The material itself exhibits minimal light scattering. The material has a large nonlinear absorption coefficient for visible or near infrared light and typically strong linear absorption of blue or UV light. Excitation of the material by nonlinear absorption causes preferential degradation of the polymer chains which are aligned with the polarization of the exposing light so as to anisotropically reduce the linear absorption in the blue/UV spectrum and anisotropically reduce the index of refraction in the visible spectrum thereby to induce birefringence in the material.

The material is more particularly the polysilane polymers having substantially symmetric sidechains, that is, sidechains of similar physical size. Preferred examples are poly-(di-n-hexylsilane), which is found to be particularly sensitive to exposure to visible light, and poly-(di-n-pentylsilane), which has exceptional optical properties, including uniform smoothness. Other polysilanes in which nonlinear birefringence occurs are at least poly-(di-n-butylsilane), poly-(di-n-octylsilane), poly-(di-n-heptylsilane), poly-(di-iso-hexylsilane), poly-(pentylhexylsilane), poly-(di-tetradecylsilane), and poly-(di-p-n-butylphenylsilane). There are believed to be many others.

A laser-induced nonlinear birefringence effect has been observed using such films which is believed to be based on a multi-photon reaction. Many of the polymers are easy to manufacture, particularly in bulk quantities, and can be very inexpensive. These polymers are soluble in a number of common hydrocarbon solvents, such as toluene, hexane, isooctane, and decaline. Using conventional photoresist spinning techniques (on a spinning table) uniform films of several microns in thickness with good optical quality can be fabricated on smooth glass, quartz or polymeric substrates. The resulting films are isotropic in the plane of the film, and the polymer chains are oriented in the plane of the film so long as the film is sufficiently thin in accordance with the invention.

Referring again to FIG. 2, there is shown a diagram illustrating the birefringence induced by exposure to pulsed laser energy for a variety of intensities. Birefringence is maximum for pulsed laser intensity of 152 MW/Cm$^2$ (Plot A). The photodegradation causing the birefringence effect has been observed to be quadratic with the intensity of exposure, indicative that there is a two-photon absorption process being carried out in the process of absorption. The largest birefringence observed in experimental application was a change of index of refraction of 0.03. Given the proper configuration, the diffraction efficiency obtainable from an index change can be as high as 80 percent. A description of the experimental results of the investigation related to the present invention is found in "Two-Photon Absorption Induced Effects in Crystalline Polysilane Films," by Schellenberg et al., *XVI International Conference on Quantum Electronics Technical Digest*, July 18–21, 1988, Tokyo, Japan (Japan Society of Applied Physics). This paper is incorporated by reference herein and made a part hereof.

Referring again to FIGS. 1A and 1B, a technique for manufacturing a birefringent grating in accordance with the invention comprises applying a two-micron thick polysilane film 12 to an optically smooth surface of a glass substrate 14, and exposing the film 12 to two interfering beams 18 and 20 of a linear polarization which are normal to incident and reflected rays and thus parallel to the surface of the film. A simple grating 30 with preserved phase information is thereby written in the film. A source 23 of the two beams is a pulsed dye laser of a wavelength at 570 nm whose output is polarized vertically (to the plane of the FIGURE). To aid in beam control, the beam 22 from the source 23 is directed through a meniscus lens 32 having a focal length of two meters.

With reference to FIG. 3, the analysis configuration for a grating 34 formed of film 12 and substrate 14 comprises a helium-neon laser 36 whose output is directed through a calcite polarizer 38, the appropriately polarized output of which is directed through a lens 40. The output at the lens 40 is directed to the grating 34. An optical power meter 42 is provided having a photodetector head 44. The head 44 is placed at selected locations off axis of the incident beam to measure received relative power at the selected locations. In this manner, the diffraction efficiency of the grating can be analyzed.

FIG. 4 is an illustration of the diffraction properties of the grating 34 as a function of the polarization of the incident light. Curve B fitted to actual data points illustrates that diffraction efficiency is clearly at maximum at a first point C where the incident laser radiation is polarized parallel to the polarization of the exposing laser. Diffraction of orthogonally-polarized light at a second point D is less by an order of magnitude. (It is apparent that there is residual diffraction. This may be due to the presence of a small surface relief grating formed simultaneously in the particular non-linear polysilane polymer used in the experiment.)

The method according to the invention has numerous applications besides a grating. For example, a conventional hologram can be produced using the process according to the invention. (It has been found that materials which photodegrade with non-linear absorption also tend to degrade with linear absorption in the blue or ultraviolet region. Therefore, in order to preserve a birefringent hologram from linear photo-degradation, an overcoat which transmits visible wavelengths but strongly absorbs the blue/UV wavelengths may be applied as a protective surface.)

In addition, by exposing the film a second time using orthogonally-polarized illumination, two orthogonally polarized holograms may be produced on the same film, thereby doubling the storage capacity of the film. Alternative images may be presented to a viewer of the hologram by switching the polarization of the reconstructing light between a first polarization favoring a first holographic pattern and a second polarization favoring a second holographic pattern.

The invention can be used in the construction of devices for separating the orthogonal polarization components of light. Polarization separators are known. These are typically prisms of various types fabricated from crystals of birefringent materials such as calcite or quartz. However, such materials are generally constructed from crystals as found in nature, which must be mined, cut and polished. Such construction is time-consuming and expensive.

FIG. 5 illustrates one embodiment of a polarization separator 40 constructed in accordance with the invention. A film of material in accordance with the invention is written with a first polarization having a first grating period as indicated by period marks 42. The same film of material is thereafter written with a second polarization which is orthogonal to the first polarization and which has a second grating period as indicated by grating marks 44. As a consequence, light polarized to defract from one grating experiences a uniform index of refraction and hence no diffraction from the second grating. Thus light of an arbitrary polarization state, such as represented by beam 46, can be broken down into orthogonal polarization components aligned with the two gratings, a first component 48 and a second component 50 orthogonal to the first component. The second component 50 is defracted at a different angle and can thus be separated in space when viewed at a distance.

The invention has been explained with reference to specific embodiments. Other embodiments will be apparent to those of ordinary skill in the art. It is therefore not intended that this invention be limited except as indicated by the appended claims.

What is claimed is:

1. A method for constructing an optical birefringent structure comprising the steps of:

applying a polysilane polymer film on a subtrate; and exposing said film to optical energy of sufficient intensity to excite nonlinear absorption in said polymer film such that a pattern of said exposing optical energy is recorded as a nonlinear optical absorption effect in said polymer film, said optical energy being of a distinct polarization state, and said nonlinear optical absorption effect evidencing said polarization state.

2. A method for constructing an optical birefringent structure comprising the steps of:

applying poly-(di-n-hexylsilane) as a film to a substrate; and exposing said film to optical energy of sufficient intensity to excite nonlinear absorption in said polymer film such that a pattern of said exposing optical energy is recorded as a nonlinear optical absorption effect in said polymer film, said optical energy being of a distinct polarization state, and said nonlinear optical absorption effect evidencing said polarization state.

3. A method for constructing an optical birefringent structure comprising the steps of:

applying poly-(di-n-pentylsilane) as a film to a substrate; and exposing said film to optical energy of sufficient intensity to excite nonlinear absorption in said polymer film such that a pattern of said exposing optical energy is recorded as a nonlinear optical absorption effect in said polymer film, said optical energy being of a distinct polarization state, and said nonlinear optical absorption effect evidencing said polarization state.

* * * * *